(12) United States Patent
Vollmer

(10) Patent No.: US 11,673,243 B2
(45) Date of Patent: Jun. 13, 2023

(54) BLIND RIVET NUT-SETTING TOOL

(71) Applicant: MILWAUKEE ELECTRIC TOOL CORPORATION, Brookfield, WI (US)

(72) Inventor: Blaine Vollmer, Plover, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 716 days.

(21) Appl. No.: 16/558,715

(22) Filed: Sep. 3, 2019

(65) Prior Publication Data

US 2020/0070327 A1 Mar. 5, 2020

Related U.S. Application Data

(60) Provisional application No. 62/727,160, filed on Sep. 5, 2018.

(51) Int. Cl.
| | |
|---|---|
| *B25B 27/00* | (2006.01) |
| *B21J 15/26* | (2006.01) |
| *B21J 15/10* | (2006.01) |
| *F16B 37/06* | (2006.01) |

(52) U.S. Cl.
CPC ......... *B25B 27/0014* (2013.01); *B21J 15/105* (2013.01); *B21J 15/26* (2013.01); *F16B 37/067* (2013.01); *Y10T 29/5377* (2015.01)

(58) Field of Classification Search
CPC ..... B21J 15/105; B21J 15/26; B25B 27/0014; F16B 37/067; Y10T 29/5377
See application file for complete search history.

(56) References Cited

U.S. PATENT DOCUMENTS

| | | | |
|---|---|---|---|
| 2,423,956 | A | 7/1947 | Amtsberg |
| 2,723,777 | A | 11/1955 | Amtsberg |
| 2,753,072 | A | 7/1956 | Mitchell |
| 2,941,687 | A | 6/1960 | Simmons |
| 3,107,806 | A | 10/1963 | Van Hecke et al. |
| 3,406,556 | A | 10/1968 | Musser |
| 3,548,627 | A | 12/1970 | Henshaw |

(Continued)

FOREIGN PATENT DOCUMENTS

| | | |
|---|---|---|
| CN | 2133383 Y | 5/1993 |
| CN | 2262472 Y | 9/1997 |

(Continued)

OTHER PUBLICATIONS

European Patent Office Extended Search Report for Application No. 19195370.2 dated Jun. 3, 2020 (8 pages).

(Continued)

*Primary Examiner* — Bayan Salone
(74) *Attorney, Agent, or Firm* — Michael Best & Friedrich LLP

(57) ABSTRACT

A blind rivet nut-setting tool includes an output shaft defining a longitudinal axis. The output shaft is moveable along the longitudinal axis between a first position and a second position. The blind rivet nut-setting tool further includes a first motor configured to rotate the output shaft about the longitudinal axis in response to an external force moving the output shaft in a rearward direction from the first position to the second position. The blind rivet nut-setting tool further includes a second motor configured to translate the output shaft along the longitudinal axis in the rearward direction.

12 Claims, 6 Drawing Sheets

(56) References Cited

U.S. PATENT DOCUMENTS

| | | | |
|---|---|---|---|
| 3,574,915 A | 4/1971 | Jeal | |
| 3,605,478 A | 9/1971 | Chirco | |
| 3,686,915 A | 8/1972 | Miller et al. | |
| 3,933,019 A | 1/1976 | Underland et al. | |
| 4,063,443 A | 12/1977 | Yarbrough | |
| 4,074,554 A | 2/1978 | Summerlin | |
| 4,140,000 A | 2/1979 | Ehmann | |
| 4,321,814 A | 3/1982 | Martin | |
| 4,368,631 A | 1/1983 | Tanikawa | |
| 4,425,782 A | 1/1984 | Todisco | |
| 4,559,806 A | 12/1985 | Schwab | |
| 4,571,976 A | 2/1986 | Schwab | |
| 4,574,612 A | 3/1986 | Tanikawa | |
| 4,612,793 A | 9/1986 | Klein | |
| 4,653,308 A | 3/1987 | Gregory | |
| 4,770,023 A | 9/1988 | Schwab | |
| 4,796,455 A | 1/1989 | Rosier | |
| 4,821,555 A | 4/1989 | Kamata et al. | |
| 4,864,839 A | 9/1989 | Schwab | |
| 4,896,522 A | 1/1990 | Rosier | |
| 4,979,279 A | 12/1990 | Garvey | |
| 5,042,131 A | 8/1991 | Low | |
| 5,050,420 A | 9/1991 | Liu | |
| 5,189,780 A | 3/1993 | Landes | |
| 5,208,959 A | 5/1993 | Rosier et al. | |
| 5,219,375 A | 6/1993 | Kamata et al. | |
| 5,259,713 A | 11/1993 | Renner et al. | |
| 5,323,946 A | 6/1994 | O'Connor et al. | |
| 5,361,473 A | 11/1994 | Landes | |
| 5,403,135 A | 4/1995 | Renner et al. | |
| 5,473,805 A | 12/1995 | Wille | |
| 5,579,641 A | 12/1996 | Wilcox | |
| 5,605,070 A | 2/1997 | Wille | |
| 5,647,209 A | 7/1997 | Wilcox | |
| 5,729,880 A | 3/1998 | Ko | |
| 6,021,553 A | 2/2000 | Bieber et al. | |
| 6,145,360 A | 11/2000 | Honsel et al. | |
| 6,212,931 B1 * | 4/2001 | Solfronk | B25B 27/0014 |
| | | | 29/243.526 |
| 6,276,050 B1 | 8/2001 | Mauer et al. | |
| 6,374,474 B1 | 4/2002 | Rössler | |
| 6,425,170 B1 | 7/2002 | Zirps et al. | |
| 6,449,822 B1 | 9/2002 | Gilbert et al. | |
| 6,502,008 B2 | 12/2002 | Maurer et al. | |
| 6,622,363 B2 | 9/2003 | Komsta | |
| 6,684,470 B1 * | 2/2004 | Joux | B25B 27/0014 |
| | | | 29/243.526 |
| 6,732,563 B1 * | 5/2004 | Chen | B25B 27/0014 |
| | | | 72/391.8 |
| 6,840,075 B2 | 1/2005 | Neri et al. | |
| 6,886,226 B1 | 5/2005 | Dear et al. | |
| 6,904,831 B2 | 6/2005 | Aasgaard | |
| 7,024,270 B2 | 4/2006 | Mauer et al. | |
| 7,032,296 B2 | 4/2006 | Zdravkovic et al. | |
| 7,101,300 B2 | 9/2006 | Milbourne et al. | |
| 7,123,982 B2 * | 10/2006 | Mauer | B21J 15/285 |
| | | | 700/174 |
| 7,146,715 B2 | 12/2006 | Villanueva | |
| 7,200,914 B2 | 4/2007 | Kaddatz | |
| 7,228,607 B1 | 6/2007 | Liu | |
| 7,314,097 B2 | 1/2008 | Jenner et al. | |
| 7,322,783 B2 | 1/2008 | Pearce et al. | |
| 7,331,205 B2 * | 2/2008 | Chitty | B21J 15/28 |
| | | | 72/21.4 |
| 7,346,970 B2 | 3/2008 | Stoger | |
| 7,346,971 B2 * | 3/2008 | Chitty | B21J 15/105 |
| | | | 72/21.1 |
| 7,409,760 B2 | 8/2008 | Mauer et al. | |
| 7,452,304 B2 | 11/2008 | Hagan et al. | |
| 7,458,245 B1 | 12/2008 | Wilcox | |
| 7,464,454 B2 | 12/2008 | Aasgaard | |
| 7,503,196 B2 * | 3/2009 | Chitty | B21J 15/10 |
| | | | 72/21.4 |
| 7,559,133 B2 | 7/2009 | Chitty et al. | |
| 7,631,534 B2 | 12/2009 | Wilcox | |
| 7,647,680 B2 | 1/2010 | Dear | |
| 7,752,739 B2 | 7/2010 | Mauer et al. | |
| 7,818,859 B2 | 10/2010 | Pearce et al. | |
| 7,900,714 B2 | 3/2011 | Milbourne et al. | |
| 8,146,240 B2 | 4/2012 | Mauer et al. | |
| 8,220,561 B2 | 7/2012 | Milbourne et al. | |
| 8,251,158 B2 | 8/2012 | Tomayko et al. | |
| 8,434,564 B2 | 5/2013 | Tomayko et al. | |
| 8,443,512 B2 | 5/2013 | Masugata | |
| 8,561,275 B2 | 10/2013 | Wille | |
| 8,631,554 B2 | 1/2014 | Wille | |
| 8,640,315 B1 | 2/2014 | Nikkel | |
| 8,776,338 B2 | 7/2014 | Yuan | |
| 9,003,621 B2 | 4/2015 | Ko | |
| 9,015,920 B2 | 4/2015 | Mauer et al. | |
| 9,027,220 B2 | 5/2015 | Schlafhauser | |
| 9,079,240 B2 | 7/2015 | Schiffler et al. | |
| 9,227,313 B2 | 1/2016 | Tseng | |
| 9,682,419 B2 | 6/2017 | Schmidt | |
| 9,724,751 B2 | 8/2017 | Stahl | |
| 9,833,832 B2 | 12/2017 | Weyland et al. | |
| 9,849,502 B2 | 12/2017 | Gaertner et al. | |
| 9,878,434 B2 | 1/2018 | Hecht et al. | |
| RE46,857 E | 5/2018 | Matsugata | |
| 9,968,988 B2 * | 5/2018 | Masugata | B21J 15/26 |
| 10,040,182 B2 | 8/2018 | Kirilichin et al. | |
| 10,058,910 B2 * | 8/2018 | Weyland | B21J 15/30 |
| 10,112,232 B2 * | 10/2018 | Honsel | B21J 15/26 |
| 10,232,429 B1 | 3/2019 | Lin et al. | |
| 10,270,316 B2 | 4/2019 | Niwa | |
| 10,307,872 B2 | 6/2019 | Simonet | |
| 10,483,901 B2 | 11/2019 | Woyciesjes et al. | |
| 10,549,445 B2 | 2/2020 | Myrhum, Jr. et al. | |
| 10,570,946 B2 | 2/2020 | Linsel | |
| 10,771,004 B2 | 9/2020 | Woyciesjes et al. | |
| 10,850,380 B2 | 12/2020 | Huber et al. | |
| 10,859,105 B2 | 12/2020 | Turechek et al. | |
| 2001/0003859 A1 | 6/2001 | Mauer et al. | |
| 2004/0247412 A1 | 12/2004 | Reck et al. | |
| 2006/0048956 A1 | 3/2006 | Hofbrucker et al. | |
| 2008/0038085 A1 | 2/2008 | Aasgaard | |
| 2008/0210060 A1 | 9/2008 | Aasgaard | |
| 2010/0275424 A1 | 11/2010 | Masugata | |
| 2010/0295696 A1 | 11/2010 | Chu et al. | |
| 2011/0271504 A1 * | 11/2011 | Preti | B21J 15/26 |
| | | | 29/243.524 |
| 2012/0030918 A1 | 2/2012 | Desalvo et al. | |
| 2012/0318547 A1 | 12/2012 | Milbourne et al. | |
| 2013/0125360 A1 | 5/2013 | Boivin et al. | |
| 2013/0161040 A1 | 6/2013 | Tomayko et al. | |
| 2013/0205577 A1 | 8/2013 | Soller | |
| 2013/0213680 A1 | 8/2013 | Chen | |
| 2013/0263433 A1 | 10/2013 | Stoian | |
| 2015/0251239 A1 | 9/2015 | Gaertner et al. | |
| 2016/0114383 A1 | 4/2016 | Honsel | |
| 2016/0151828 A1 | 6/2016 | Weyland | |
| 2017/0320127 A1 | 11/2017 | Tripp et al. | |
| 2018/0003210 A1 | 1/2018 | Linsel | |
| 2018/0126446 A1 | 5/2018 | Mori | |
| 2018/0318992 A1 | 11/2018 | Kirilichin et al. | |
| 2019/0240819 A1 | 8/2019 | Macchieraldo | |
| 2019/0283110 A1 | 9/2019 | Kawai et al. | |
| 2019/0283111 A1 | 9/2019 | Kawai et al. | |
| 2019/0283112 A1 | 9/2019 | Ikuta et al. | |
| 2019/0314888 A1 | 10/2019 | Ikuta et al. | |
| 2019/0351477 A1 | 11/2019 | Yabuguchi et al. | |
| 2019/0375079 A1 | 12/2019 | Kamiya | |
| 2020/0070327 A1 | 3/2020 | Vollmer | |
| 2020/0122224 A1 | 4/2020 | Wu | |
| 2020/0130047 A1 | 4/2020 | Yabunaka et al. | |
| 2020/0139424 A1 | 5/2020 | Yabuguchi et al. | |
| 2020/0158157 A1 | 5/2020 | Linsel | |
| 2020/0198167 A1 | 6/2020 | Myrhum, Jr. et al. | |
| 2020/0238489 A1 * | 7/2020 | Mori | B21J 15/26 |

(56) References Cited

U.S. PATENT DOCUMENTS

| | | |
|---|---|---|
| 2021/0039234 A1 | 2/2021 | Kirilichin et al. |
| 2021/0069773 A1 | 3/2021 | Yabunaka et al. |

FOREIGN PATENT DOCUMENTS

| | | | |
|---|---|---|---|
| CN | 102294426 B | 12/2011 | |
| CN | 202726814 U | 2/2013 | |
| CN | 203031537 U | 7/2013 | |
| CN | 203184566 U | 9/2013 | |
| CN | 203830638 U | 9/2014 | |
| CN | 104148571 A | 11/2014 | |
| CN | 204018628 U | 12/2014 | |
| CN | 204094710 U | 1/2015 | |
| CN | 204183494 U | 3/2015 | |
| CN | 104550615 A | 4/2015 | |
| CN | 104550616 A | 4/2015 | |
| CN | 104550619 A | 4/2015 | |
| CN | 204565044 U | 8/2015 | |
| CN | 205324607 U | 6/2016 | |
| CN | 104999410 B | 3/2017 | |
| CN | 206028637 U | 3/2017 | |
| CN | 106670373 A | 5/2017 | |
| CN | 106799451 A | 6/2017 | |
| CN | 107559286 A | 1/2018 | |
| CN | 207563672 U | 7/2018 | |
| CN | 109909430 A | 6/2019 | |
| CN | 210576957 U | 5/2020 | |
| CN | 105589414 B | 1/2021 | |
| DE | 7206720 U | 11/1972 | |
| DE | 2320080 C3 | 8/1981 | |
| DE | 2417646 C2 | 4/1985 | |
| DE | 3306827 C2 | 5/1986 | |
| DE | 3532932 A1 | 3/1987 | |
| DE | 3603421 A1 | 8/1987 | |
| DE | 3308915 C2 | 9/1987 | |
| DE | 4100709 A1 | 7/1992 | |
| DE | 9207634 U1 | 8/1992 | |
| DE | 9300118 U1 | 2/1993 | |
| DE | 9406626 U1 | 6/1994 | |
| DE | 4406946 A1 | 9/1995 | |
| DE | 3400942 C2 | 11/1995 | |
| DE | 29502918 U1 | 6/1996 | |
| DE | 19502855 C2 | 11/1997 | |
| DE | 29902826 U1 | 6/1999 | |
| DE | 3701883 C2 | 9/1999 | |
| DE | 19809354 A1 | 9/1999 | |
| DE | 19819251 B4 | 11/1999 | |
| DE | 29900048 U1 | 6/2000 | |
| DE | 19902858 A1 | 7/2000 | |
| DE | 20013585 U1 | 12/2000 | |
| DE | 29914202 U1 | 12/2000 | |
| DE | 10130681 B4 | 1/2003 | |
| DE | 20023264 U1 | 7/2003 | |
| DE | 10325851 B4 | 12/2004 | |
| DE | 102005022748 A1 | 11/2006 | |
| DE | 102005053221 A1 | 5/2007 | |
| DE | 102005054048 A1 | 5/2007 | |
| DE | 10342143 B4 | 7/2007 | |
| DE | 202008003684 U1 | 7/2008 | |
| DE | 102008013044 B3 | 7/2009 | |
| DE | 102010024610 B4 | 12/2010 | |
| DE | 202011005601 U1 | 7/2011 | |
| DE | 102010022022 B4 | 12/2011 | |
| DE | 102010035613 A1 | 3/2012 | |
| DE | 102012216838 A1 | 6/2014 | |
| DE | 102013008653 B4 | 11/2014 | |
| DE | 102013208288 A1 | 11/2014 | |
| DE | 102014207340 A1 | 11/2014 | |
| DE | 102013105703 B4 | 12/2014 | |
| DE | 102013221789 A1 | 4/2015 | |
| DE | 102013221790 A1 | 5/2015 | |
| DE | 102014223034 A1 | 5/2016 | |
| DE | 102014117401 A1 | 6/2016 | |
| DE | 102015103277 A1 | 9/2016 | |
| DE | 102015116559 A1 | 3/2017 | |
| DE | 102015216360 A1 | 3/2017 | |
| DE | 102015119571 A1 | 5/2017 | |
| DE | 102015221476 A1 | 5/2017 | |
| DE | 102016209749 A1 | 12/2017 | |
| DE | 102017209844 A1 | 1/2018 | |
| DE | 102017219712 A1 | 5/2019 | |
| DE | 102017223713 A1 | 6/2019 | |
| DE | 102018207443 A1 | 11/2019 | |
| DE | 202020101120 U1 | 3/2020 | |
| DE | 102019107380 A1 | 9/2020 | |
| EP | 0043216 B1 | 1/1982 | |
| EP | 0043217 B1 | 1/1982 | |
| EP | 0081345 B1 | 6/1983 | |
| EP | 0119007 A2 | 9/1984 | |
| EP | 0120309 B1 | 10/1984 | |
| EP | 0027663 B1 | 2/1985 | |
| EP | 0236464 B1 | 9/1987 | |
| EP | 0259405 B1 | 3/1988 | |
| EP | 0302136 B1 | 2/1989 | |
| EP | 0325669 B1 | 8/1989 | |
| EP | 0456852 B1 | 11/1991 | |
| EP | 0494747 B1 | 7/1992 | |
| EP | 0670199 B1 | 9/1995 | |
| EP | 0807007 B1 | 11/1997 | |
| EP | 1018407 B1 | 7/2000 | |
| EP | 1089839 B1 | 4/2001 | |
| EP | 1258321 A2 * | 11/2002 | ........... B25B 23/141 |
| EP | 1503089 B1 | 2/2005 | |
| EP | 0927585 B1 | 4/2006 | |
| EP | 1258321 B1 | 7/2007 | |
| EP | 1707848 B1 | 8/2008 | |
| EP | 2093024 A1 * | 8/2009 | .............. B21J 15/20 |
| EP | 2093024 A1 | 8/2009 | |
| EP | 2390059 B1 | 11/2011 | |
| EP | 2399712 B1 | 12/2011 | |
| EP | 2402095 A1 | 1/2012 | |
| EP | 2608909 B1 | 7/2013 | |
| EP | 2786843 A2 | 10/2014 | |
| EP | 2827006 A1 | 1/2015 | |
| EP | 2409814 B1 | 3/2015 | |
| EP | 2910321 A1 | 8/2015 | |
| EP | 2918357 B1 | 9/2015 | |
| EP | 2626154 B1 | 12/2015 | |
| EP | 2985094 A1 | 2/2016 | |
| EP | 2862676 B1 | 6/2016 | |
| EP | 3025807 A1 | 6/2016 | |
| EP | 3159112 A2 | 4/2017 | |
| EP | 3167973 A1 | 5/2017 | |
| EP | 3263921 A1 | 1/2018 | |
| EP | 3067157 B1 | 4/2018 | |
| EP | 3342506 A1 | 7/2018 | |
| EP | 3181260 B1 | 9/2019 | |
| GB | 1457326 A | 12/1976 | |
| JP | 2000190246 A | 7/2000 | |
| JP | 2000190246 A * | 7/2000 | |
| WO | WO 87/04647 | 8/1987 | |
| WO | WO 99/65630 | 12/1999 | |
| WO | WO0236282 A1 | 5/2002 | |
| WO | WO0243898 A2 | 6/2002 | |
| WO | WO2009072836 A2 | 6/2009 | |
| WO | WO 2012/025102 A2 | 3/2012 | |
| WO | WO2013180769 A1 | 12/2013 | |
| WO | WO 2014/195189 A1 | 12/2014 | |
| WO | WO2016050121 A1 | 4/2016 | |
| WO | WO2016086844 A1 | 6/2016 | |
| WO | WO2018139372 A1 | 8/2018 | |
| WO | WO2019049910 A1 | 3/2019 | |
| WO | WO2019054257 A1 | 3/2019 | |
| WO | WO2020016288 A1 | 1/2020 | |
| WO | WO2020233914 A1 | 11/2020 | |

(56) References Cited

FOREIGN PATENT DOCUMENTS

| | | |
|---|---|---|
| WO | WO2020245310 A1 | 12/2020 |
| WO | WO2021017548 A1 | 2/2021 |

OTHER PUBLICATIONS

International Search Report and Written Opinion for Application No. PCT/US2022/038687 dated Nov. 23, 2022 (13 pages).

\* cited by examiner

BLIND RIVET NUT-SETTING TOOL

CROSS-REFERENCE TO RELATED APPLICATIONS

This application claims priority to U.S. Provisional Patent Application No. 62/727,160 filed on Sep. 5, 2018, the entire content of which is incorporated herein by reference.

FIELD OF THE INVENTION

The present invention relates to blind rivet nut-setting tools, and more particularly to powered blind rivet nut-setting tools.

BACKGROUND OF THE INVENTION

Powered blind rivet nut-setting tools rotate an output shaft to thread the output shaft into a blind rivet nut. After the output shaft is threaded into the blind rivet nut, the output shaft performs a setting stroke to set the blind rivet nut on a workpiece.

SUMMARY OF THE INVENTION

The present invention provides, in one aspect, a blind rivet nut-setting tool comprising an output shaft defining a longitudinal axis. The output shaft is moveable along the longitudinal axis between a first position and a second position. The blind rivet nut-setting tool further comprises a first motor configured to rotate the output shaft about the longitudinal axis in response to an external force moving the output shaft in a rearward direction from the first position to the second position. The blind rivet nut-setting tool further comprises a second motor configured to translate the output shaft along the longitudinal axis in the rearward direction.

The present invention provides, in another aspect, a blind rivet nut-setting tool comprising an output shaft defining a longitudinal axis. The output shaft is moveable along the longitudinal axis between a first output shaft position and a second output shaft position. The blind rivet nut-setting tool further comprises a carrier moveable along the longitudinal axis between a first carrier position and a second carrier position. The blind rivet nut-setting tool further comprises a first motor configured to rotate the output shaft about the longitudinal axis in response to the output shaft moving the output shaft in a rearward direction from the first output shaft position to the second output shaft position. The blind rivet nut-setting tool further comprises a second motor configured to translate the carrier along the longitudinal axis between the first carrier position and the second carrier position. The output shaft is translated along the longitudinal axis in the rearward direction when the second motor moves the carrier from the first carrier position to the second carrier position.

The present invention provides, in yet another aspect, a method comprising threading a blind rivet nut onto an output shaft of the tool, pressing the blind rivet nut against a workpiece, thereby applying an external force to the output shaft to move the output shaft in a rearward direction along a longitudinal axis from a first position to a second position, activating a first motor to rotate the output shaft about the longitudinal axis in response to the output shaft reaching the second position, thereby further threading the blind rivet nut onto the output shaft, and activating a second motor to translate the output shaft along the longitudinal axis in the rearward direction, thereby setting the blind rivet nut on the workpiece.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
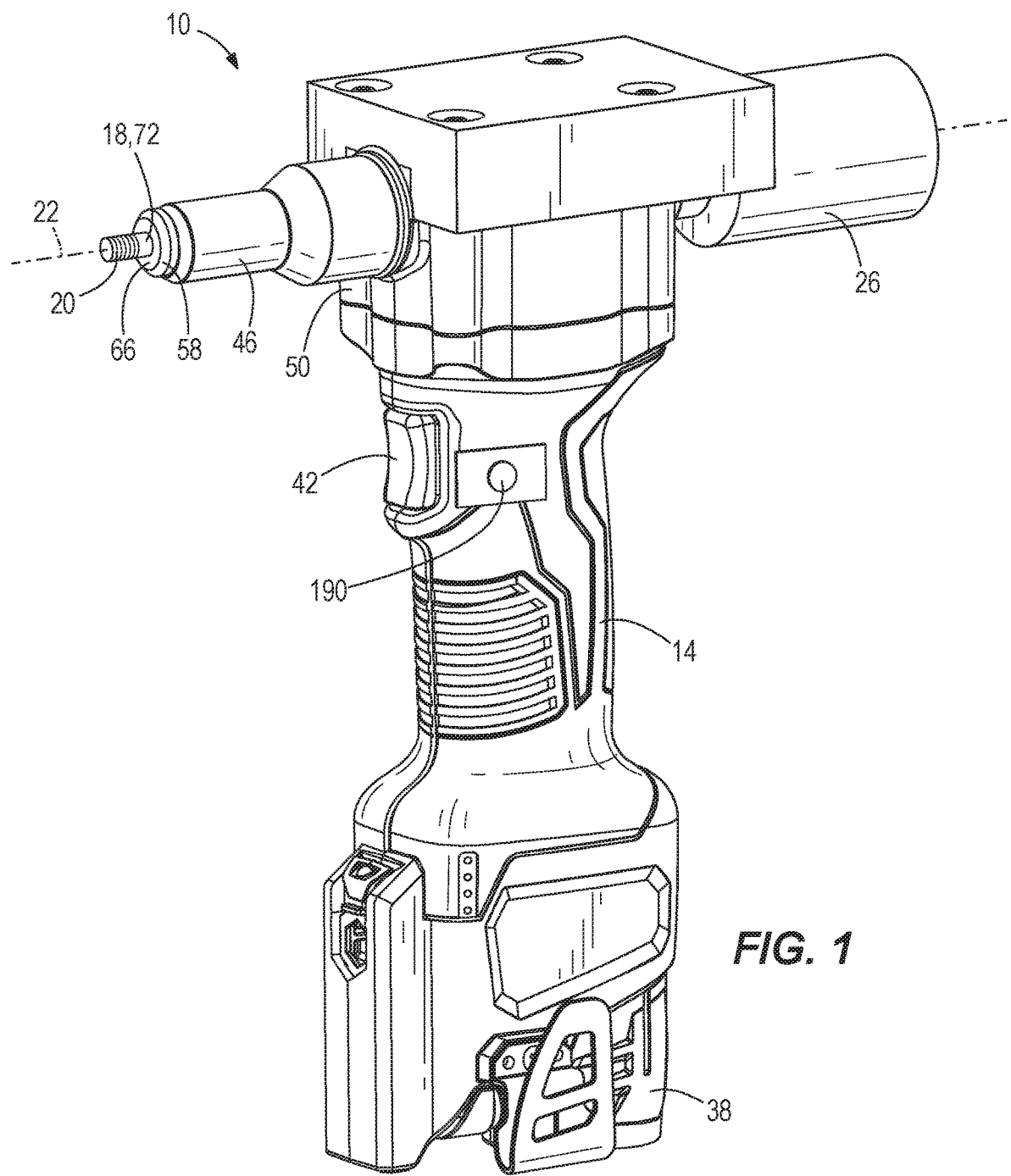
FIG. 1 is a perspective view of a blind rivet nut-setting tool.
Figure 2:
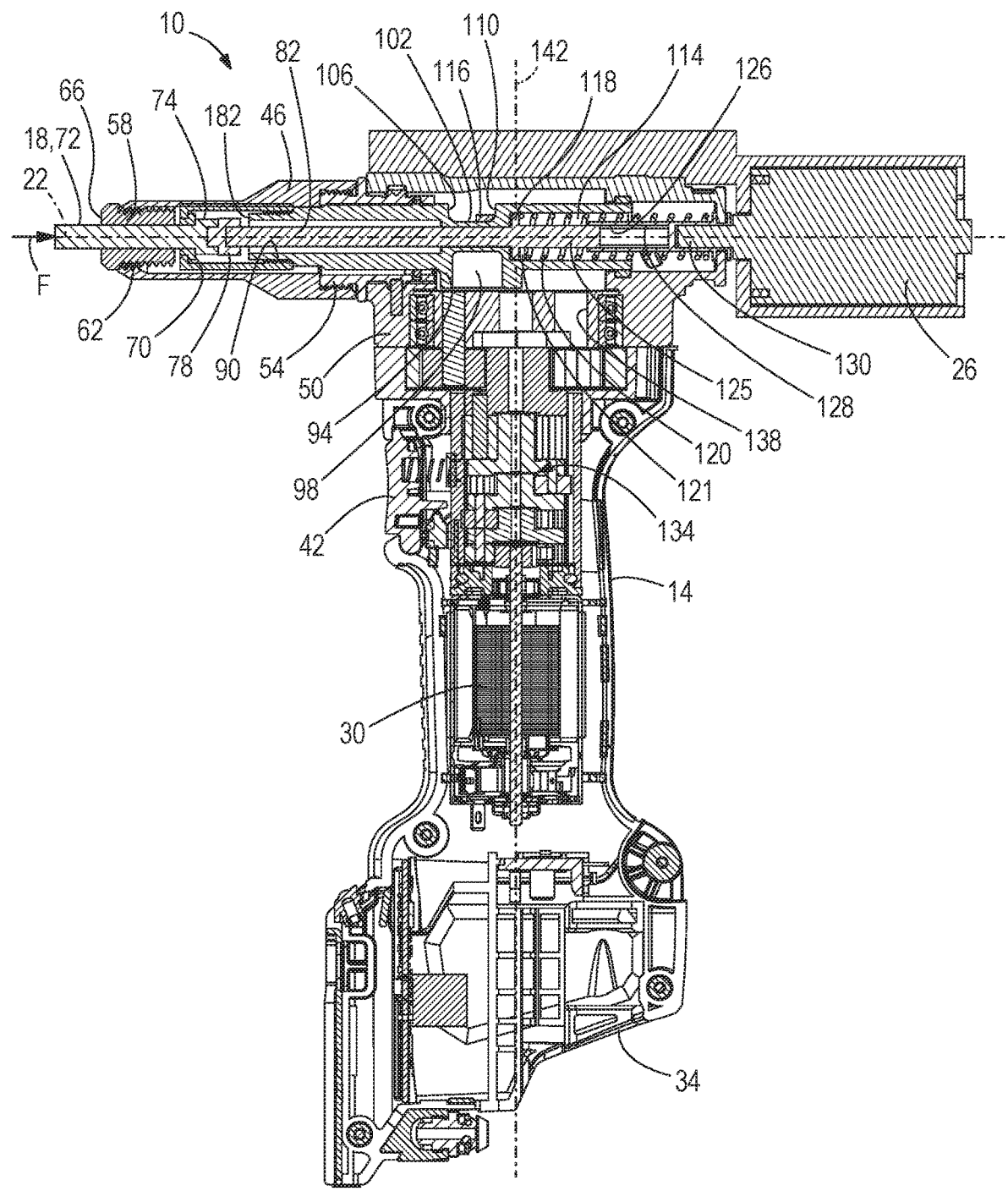
FIG. 2 is a cross-sectional view of the blind rivet nut-setting tool of FIG. 1.

As shown in FIGS. 1 and 2, a blind rivet nut-setting tool 10 includes a housing 14, an output shaft 18 having threads 20 and defining a longitudinal axis 22, a first motor 26 for rotating the output shaft 18 about the longitudinal axis 22, and a second motor 30 for translating the output shaft 18 along the longitudinal axis 22. The housing 14 includes a battery receptacle 34 (FIG. 2) for receiving a battery 38 (FIG. 1) to power the first and second motors 26, 30 and a trigger 42 for activating the second motor 30 to initiate a setting stroke, as explained in further detail below.

With reference to FIG. 2, the housing 14 includes a front piece 46 that is threaded onto a main body 50 of the housing 14 via threads 54. A nosepiece 58 is threaded into the front piece 46 via threads 62. The output shaft 18 extends through the nosepiece 58 and into a tube 70. The output shaft 18 is a multi-piece output shaft including a working end 72 having the threads 20 and a shoulder 74 within the tube 70, a first piece 78 within the tube 70, and a second piece 82 that extends into the tube 70 and through a carrier 86 that is arranged along the longitudinal axis 22. In alternative embodiments, the output shaft 18 is integrally formed along its entire length. The tube 70 is threaded to the carrier 86 via threads 90.

Figure 3:
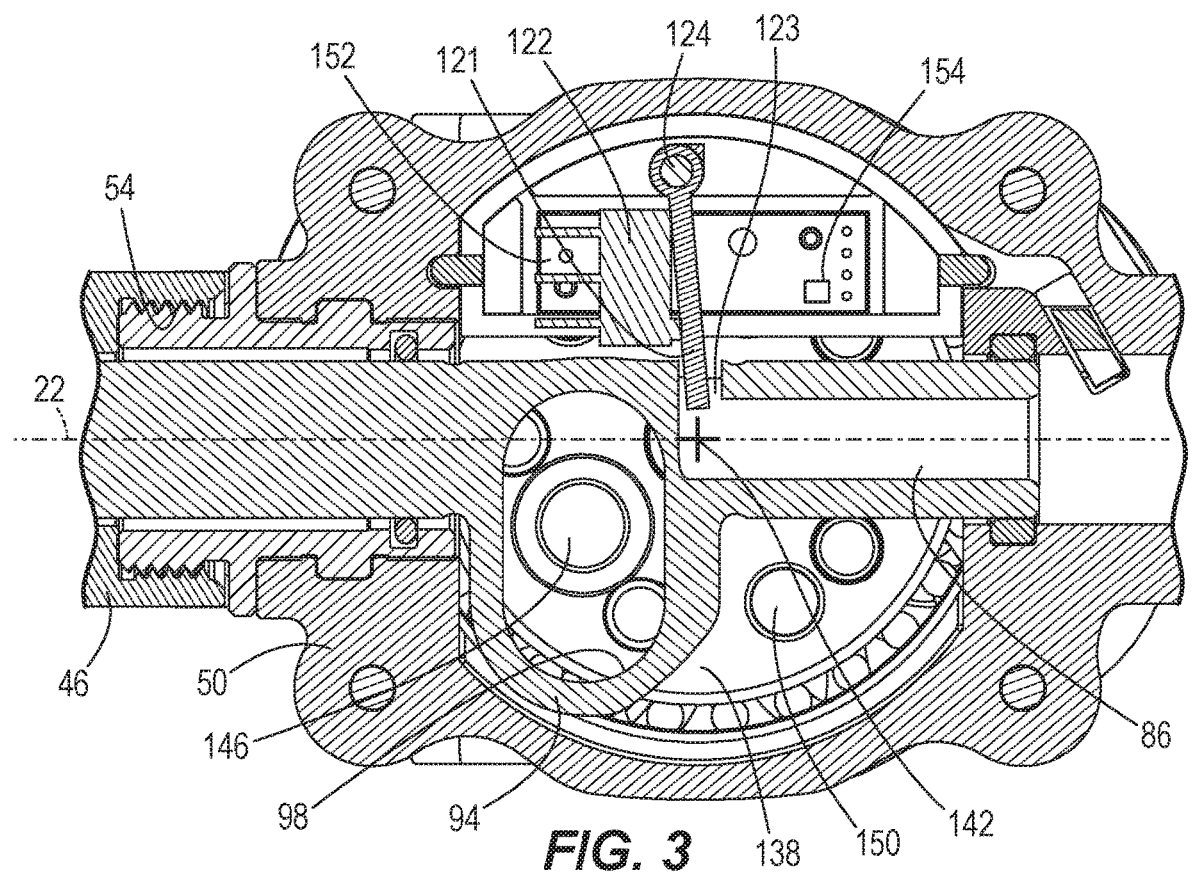
FIG. 3 is an enlarged cross-sectional view of the blind rivet nut-setting tool of FIG. 1.
Figure 4:
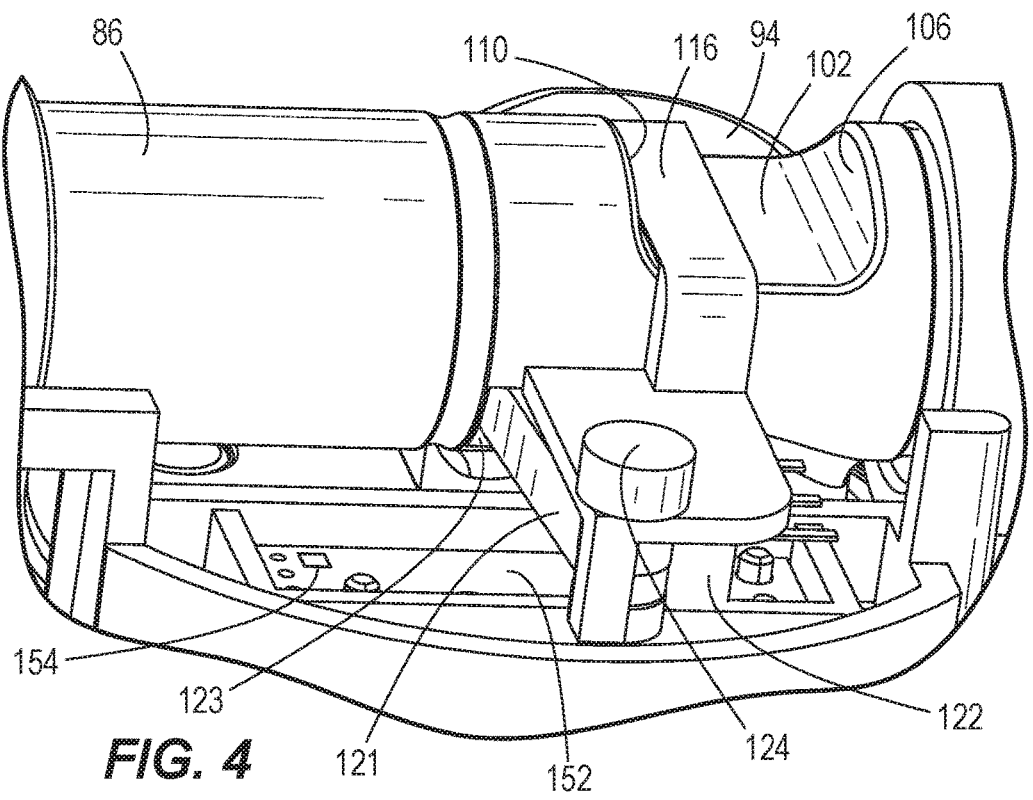
FIG. 4 is an enlarged perspective view of the blind rivet nut-setting tool of FIG. 1, with portions removed.

With reference to FIGS. 2 and 3, the carrier 86 includes a lobe 94 with a recess 98, a groove 102 defined by first and second shoulders 106, 110 and a bore 114. A bracket 116 is arranged in the groove 102. The second piece 82 of the output shaft 18 includes a flange 118 arranged in the bore 114. The flange 118 is biased by a compression spring 120 towards the carrier 86, such that the carrier 86 is biased toward the nosepiece 58. As shown in FIGS. 2-4, an actuating arm 121 of a limit switch 122 extends through a groove 123 in the carrier 86 into the bore 114 of the carrier 86, and is arranged on a side of the flange 118 of the second piece 82 opposite the bracket 116. The bracket 116 supports the limit switch 122, and the actuating arm 121 is pivotably coupled to the bracket 116 via a pivot 124 (e.g., a fastener), allowing the actuating arm 121 to pivot between a neutral position, in which the limit switch is not actuated, and an actuating position, in which the limit switch 122 is actuated.

An end 125 of the second piece 82 of the output shaft 18 extends into a recess 126 of a drive shaft 128, which is coupled for rotation with an output shaft 130 of the first motor 26. The recess 126 of the drive shaft 128 has a non-circular cross-sectional shape, and the end 125 of the second piece 82 of the output shaft 18 has a corresponding non-circular cross-sectional shape, such that the second piece 82 of the output shaft 18 is coupled for co-rotation with the drive shaft 128. In alternative embodiments, the end 125 of the second piece 82 of the output shaft 18 has a spline fit within the recess 126 of the drive shaft 128.

When the tool 10 is not operating, the compression spring 120, via the flange 118 of the second piece 82, biases the output shaft 18 to a neutral, first output shaft position shown in FIG. 2. Likewise, the carrier 86 is biased by the compression spring 120, via the flange 118 of the second piece 82, to a neutral first carrier position, also shown in FIG. 2. When the carrier 86 is in the first carrier position, the second shoulder 110 abuts against the bracket 116.

With reference to FIGS. 2 and 3, the second motor 30 transmits torque through a multi-stage planetary transmission 134 terminating in a cam member 138 that defines a rotational axis 142 that intersects and is perpendicular to the longitudinal axis 22. The cam member 138 includes a pin 146 that is eccentrically arranged on the cam member 138 and extends into the recess 98 of the lobe 94 of the carrier 86. With reference to FIG. 3, the cam member 138 includes a magnet 150, and a printed circuit board (PCB) 152 in the main body 50 of the housing 14 includes a sensor 154, such as a Hall-effect sensor, that is configured to detect the proximity of the magnet 150 as the cam member 138 rotates relative to the PCB 152. In other embodiments, the magnet 150 can be located on the carrier 86, such that the sensor 154 can detect proximity of the magnet as the carrier 86 translates relative to the PCB 152.

Figure 5:
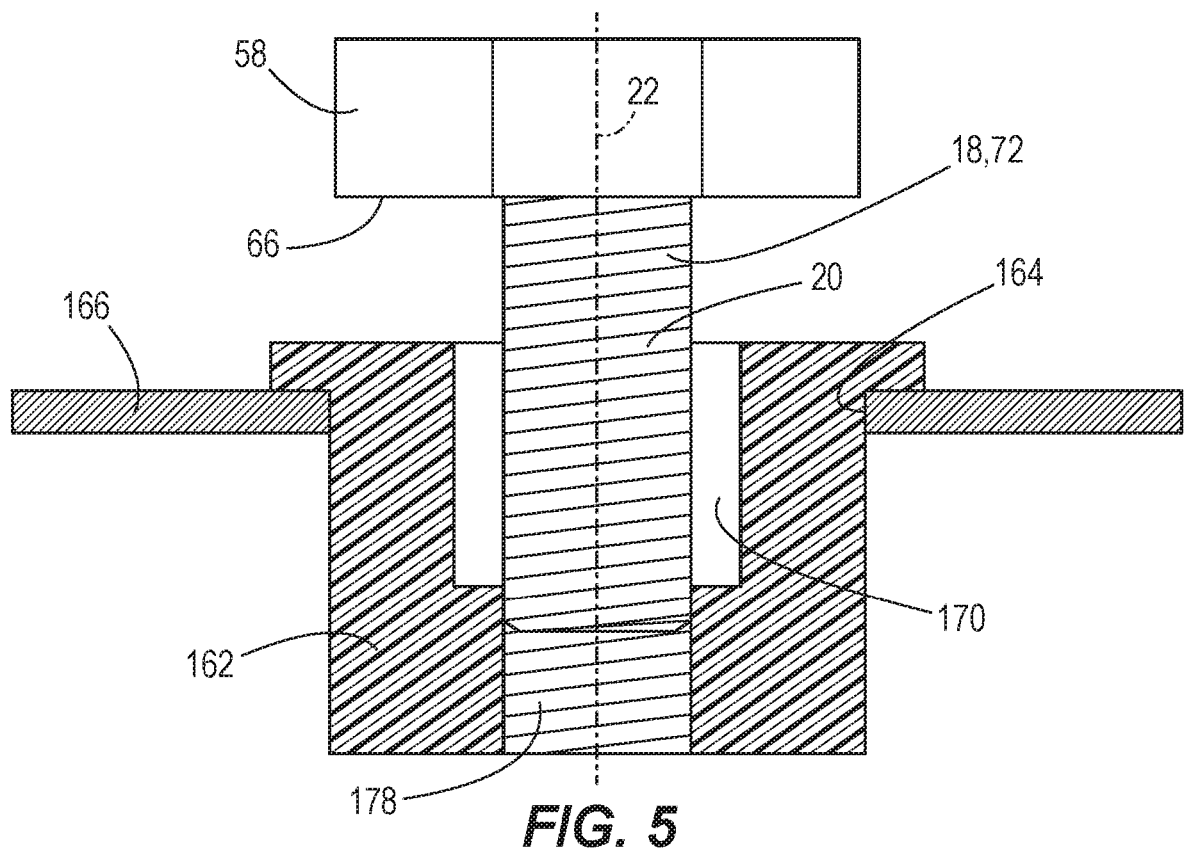
FIG. 5 is a cross-sectional view of an output shaft of the blind rivet nut-setting tool of FIG. 1 with a blind rivet nut partially threaded onto the output shaft, and the blind rivet nut inserted through an aperture in a workpiece.

In operation, an operator uses the tool 10 to set a blind rivet nut 162 into an aperture 164 in a workpiece 166, as shown in FIG. 5. First, the operator manually threads the blind rivet nut 162 partially onto the working end 72 of the output shaft 18. Specifically, the operator places the working end 72 of the output shaft 18 into an unthreaded bore 170 of the blind rivet nut 162, and then manually partially threads a threaded bore 178 of the blind rivet nut 162 onto the threads 20 of the working end 72 as shown in FIG. 5.

Figure 6:
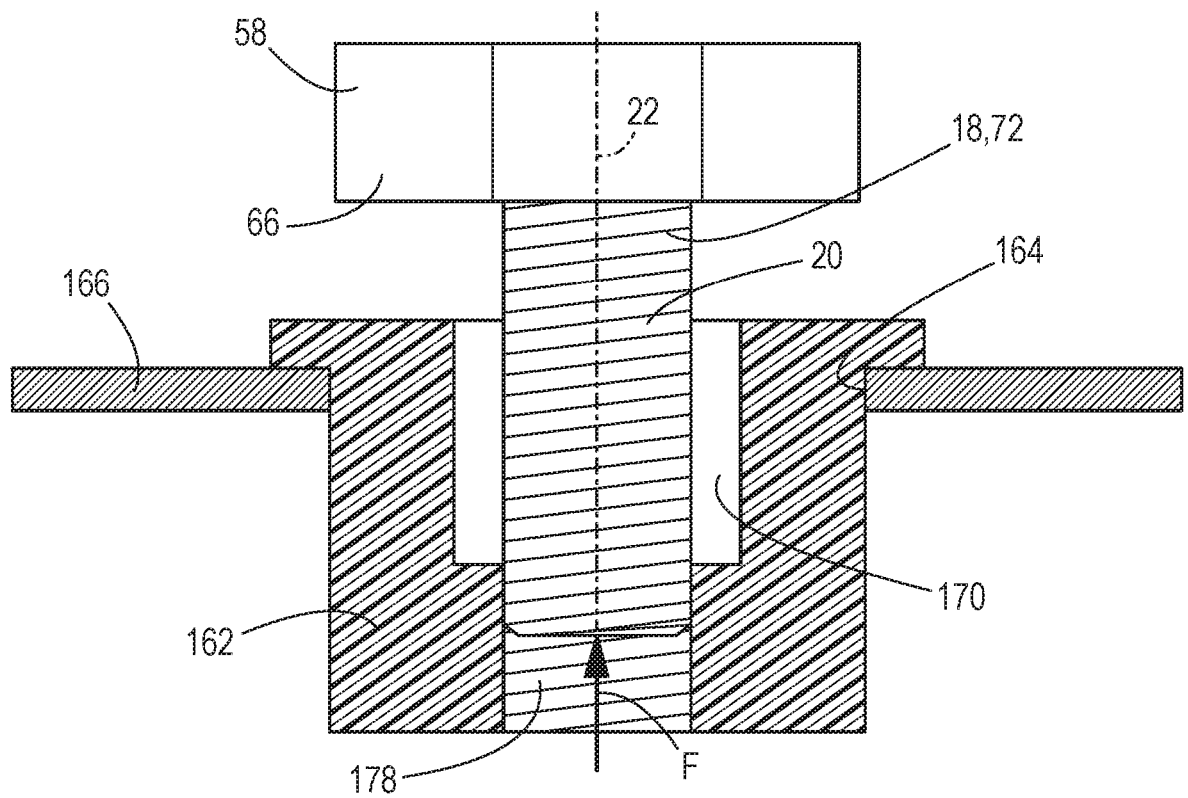
FIG. 6 is a cross-sectional view of the output shaft of the blind rivet nut-setting tool of FIG. 1 translated in a rearward direction to initiate a threading action of the output shaft into the blind rivet nut.

The operator then inserts the blind rivet nut 162 into the opening 164 in the workpiece 166 and pushes the tool 10 toward the workpiece 166. As shown in FIG. 6, this results in a normal force F being applied to the output shaft 18 in a rearward direction toward the first motor 26, causing the output shaft 18 to translate in the rearward direction along the longitudinal axis 22, relative to the nosepiece 58 and carrier 86. Rearward translation of the output shaft 18 also pivots the actuating arm 121 (via the interaction between the flange 118 and the arm 121) away from the switch 122, from the neutral position to the actuating position. In the actuating position, the arm 121 actuates the limit switch 122, coinciding with the output shaft 18 reaching the second output shaft position.

Figure 7:
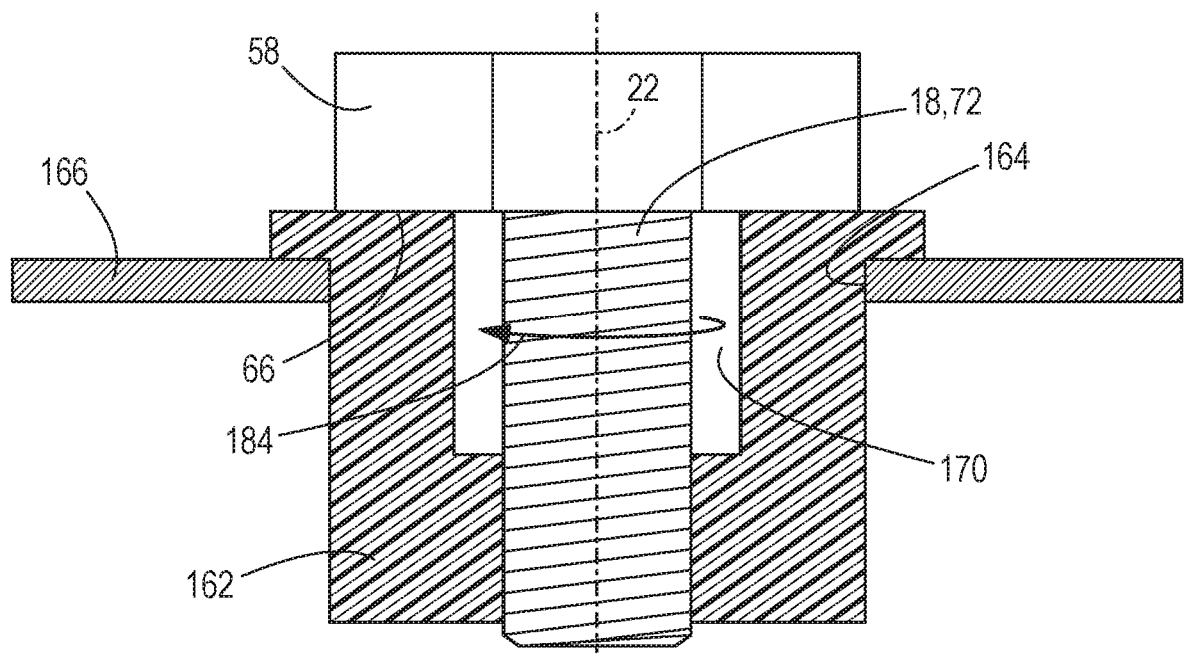
FIG. 7 is a cross-sectional view of the output shaft of the blind rivet nut-setting tool of FIG. 1 being threaded into the blind rivet nut.
Figure 8:
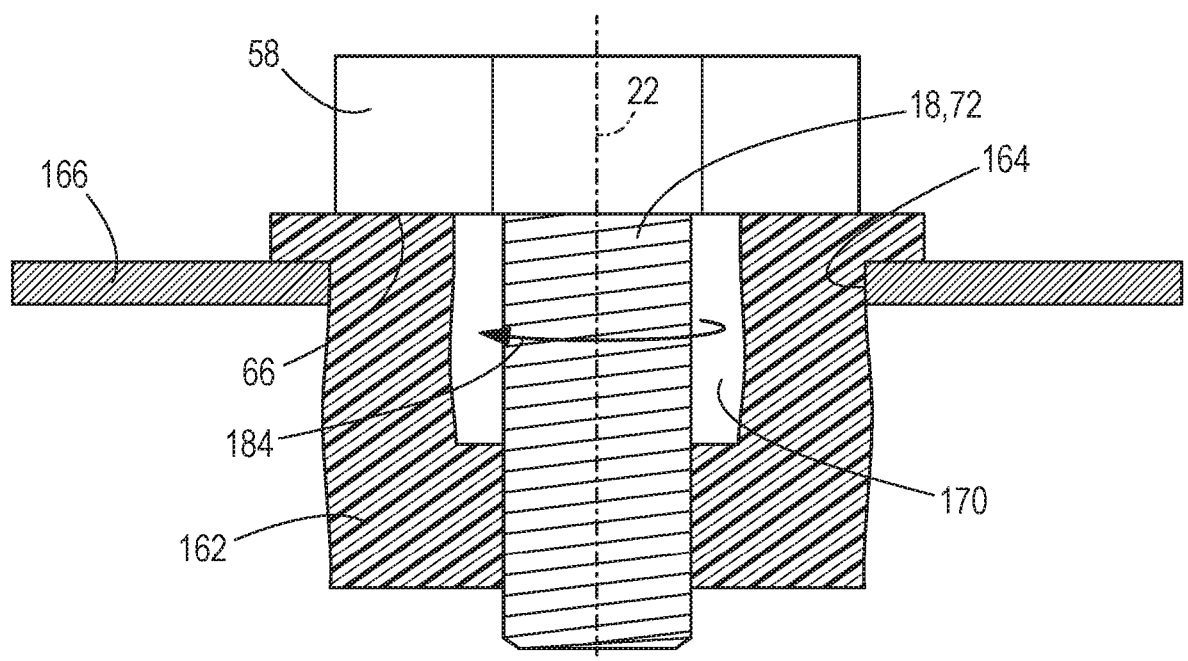
FIG. 8 is a cross-sectional view of the output shaft of the blind rivet nut-setting tool of FIG. 1 being further threaded into the blind rivet nut after the blind rivet nut has reached a nosepiece of the blind rivet nut-setting tool.

In response to the limit switch 122 being actuated when the output shaft 18 has reached the second output shaft position, the first motor 26 rotates the output shaft 130 in a threading direction, which causes corresponding rotation of the drive shaft 128 and the output shaft 18, thus beginning a threading action into the blind rivet nut 162. Specifically, as the operator continues to push the working end 72 of the output shaft 18 toward the blind rivet nut 162, the output shaft 18 rotates in a threading direction 184 (FIG. 7), causing the working end 72 of the output shaft 18 to be threaded into the threaded bore 178 of the blind rivet nut 162. As the output shaft 18 threads into the threaded bore 178, the blind rivet nut 162 translates along the output shaft 18 until it abuts against the end 66 of the nosepiece 58 as shown in FIG. 7. However, the output shaft 18 continues rotating in the first direction 184 as shown in FIG. 8, thereby continuing to thread its way through the threaded bore 178 of the blind rivet nut 162. Thus, the output shaft 18 rotates about and translates along the longitudinal axis 22 away from the second output shaft position and towards the first output shaft position until the actuating arm 121 has returned to its neutral position in which the limit switch 122 is de-actuated. Once the limit switch 122 is de-actuated, the first motor 26 is deactivated, thereby ceasing rotation of the output shaft 18, which is now fully threaded into the blind rivet nut 162.

After the blind rivet nut 162 is fully threaded onto the output shaft 18, the operator may initiate a setting stroke by pulling the trigger 42 to activate the second motor 30. The second motor 30 rotates the cam member 138 counterclockwise as viewed in FIG. 3 about the rotation axis 142 via the transmission 134, causing the pin 146 to move within the recess 98 of the lobe 94 and thereby pull the lobe 94 away from the front piece 46.

Figure 9:
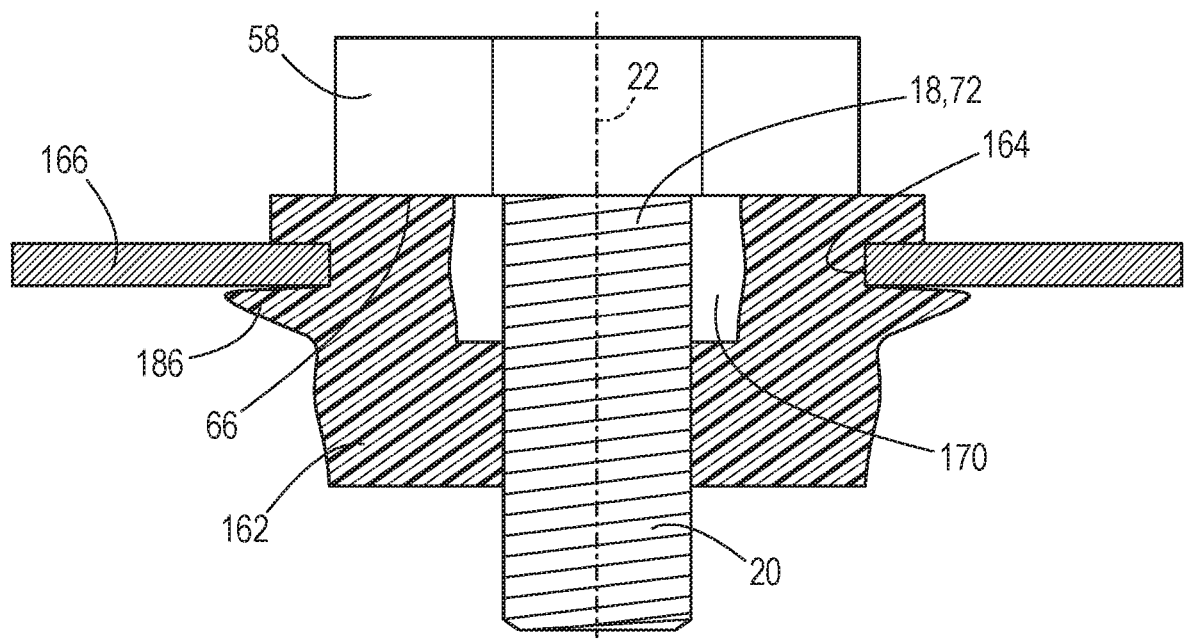
FIG. 9 is a cross-sectional view of the output shaft of the blind rivet nut-setting tool of FIG. 1 performing a setting stroke on the blind rivet nut.

As the lobe 94 is pulled away from the front piece 46, the carrier 86 translates along the longitudinal axis 22 from the first carrier position to a second carrier position, thereby pulling the output shaft 18 (via the flange 118) along the longitudinal axis 22 from the first output shaft position (or a position near the first output shaft position) to a third output shaft position corresponding to the second carrier position of the carrier 86. During the setting stroke, the output shaft 18 sets the blind rivet nut 162 by deforming a portion 186 of the blind rivet nut 162 against the workpiece 166, as shown in FIG. 9. In the described embodiment, the third output shaft position is different than the second output shaft position. However, in other embodiments, the third output shaft position may be the same as the second output shaft position.

As the carrier 86 moves from the first carrier position to the second carrier position, the actuating arm 121 is pivoted to the actuating position via its arrangement in the groove 123 of the carrier 86. However, during the setting stroke, actuation of the limit switch 122 does not result in the first motor 26 being activated. Rather, the first motor 26 is maintained in a deactivated state to avoid rotating the output shaft 18 during the setting stroke.

When the carrier 86 reaches the second carrier position during the setting stroke, the magnet 150 in the cam member 138 is detected by the sensor 154, causing the second motor 30 to reverse its rotational direction. Thus, the cam member 138 is rotated clockwise as viewed in FIG. 3 about the rotation axis 142, causing the pin 146 to move within the recess 98 of the lobe 94 and thereby pull the lobe 94 toward from the front piece 46. The carrier 86 is thus moved in a forward direction towards the first carrier position (FIG. 2).

Figure 10:
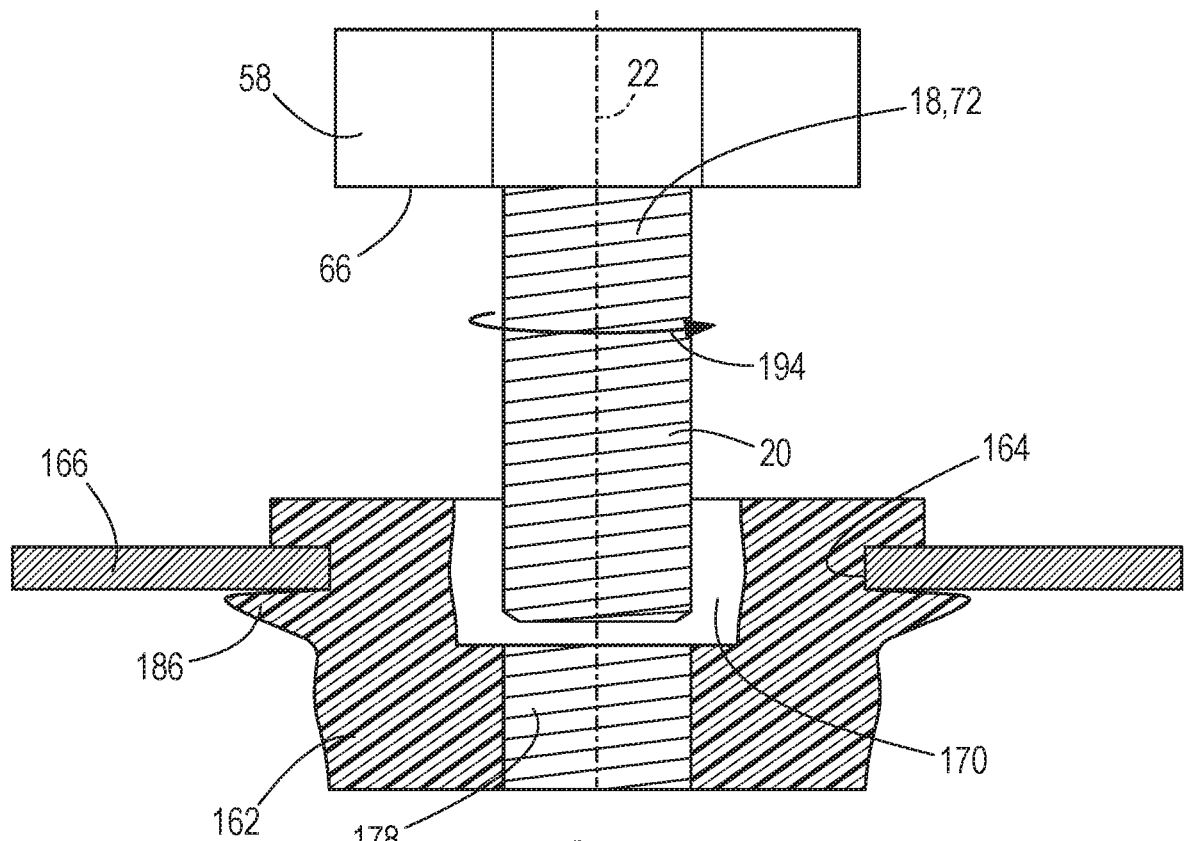
FIG. 10 is a cross-sectional view of the output shaft of the blind rivet nut-setting tool of FIG. 1 being unthreaded from the blind rivet nut.

Once the carrier 86 has returned to the first carrier position at which time the setting stroke has been completed, the operator may depress a reverse button 190 (FIG. 1) to activate the first motor 26 and rotate the output shaft 130 in an unthreading direction that is opposite the threading direction. The output shaft 18 is also rotated in a reverse direction, thus beginning an unthreading action from the blind rivet nut 162. Specifically, as shown in FIG. 10, the output shaft 18 is caused to rotate in an unthreading direction 194 that is opposite the threading direction 184, thus unthreading the output shaft 18 from the threaded bore 178 of the now-set blind rivet nut 162. As the output shaft 18 unthreads from the blind rivet nut 162, the output shaft 18 also translates along the longitudinal axis 22 to return to the first output shaft position where the tool 10 is ready for a subsequent setting operation.

Various features of the invention are set forth in the following claims.

What is claimed is:

1. A blind rivet nut-setting tool comprising:
an output shaft defining a longitudinal axis, the output shaft moveable along the longitudinal axis between a first position and a second position;
a first motor configured to rotate the output shaft about the longitudinal axis in response to an external force moving the output shaft in a rearward direction from the first position to the second position;
a drive shaft configured to receive torque from the first motor, the drive shaft engaged with the output shaft at a rear end of the output shaft, such that the output shaft is configured to receive torque from the drive shaft in response to the drive shaft receiving torque from the first motor; and
a second motor configured to translate the output shaft along the longitudinal axis in the rearward direction,
wherein the second motor is configured to translate the output shaft in the rearward direction toward a third position that is rearward of the second position.

2. The blind rivet nut-setting tool of claim 1, wherein the rear end of the output shaft extends into a recess of the drive shaft, and wherein the recess has a non-circular cross-sectional shape, and wherein the rear end of the output shaft has a non-circular cross-sectional shape that corresponds to the non-circular cross-sectional shape of the recess.

3. The blind rivet nut-setting tool of claim 1, further comprising a limit switch that is activated when the output shaft is moved from the first position to the second position, wherein the first motor rotates the output shaft about the longitudinal axis in response to the limit switch being activated.

4. A blind rivet nut-setting tool comprising:
an output shaft defining a longitudinal axis, the output shaft moveable along the longitudinal axis between a first output shaft position and a second output shaft position;
a carrier moveable along the longitudinal axis between a first carrier position and a second carrier position;
a first motor configured to rotate the output shaft about the longitudinal axis in response to the output shaft moving in a rearward direction from the first output shaft position to the second output shaft position;
a second motor configured to translate the carrier along the longitudinal axis between the first carrier position and the second carrier position; and
a cam member rotated by the second motor and including a pin arranged in a lobe of the carrier, such that in response to the cam member being rotated in a first direction by the second motor, the carrier is translated along the longitudinal axis from the first carrier position to the second carrier position,
wherein the output shaft is translated along the longitudinal axis in the rearward direction when the second motor moves the carrier from the first carrier position to the second carrier position.

5. The blind rivet nut-setting tool of claim 4, further comprising a limit switch that is activated when the output shaft is moved from the first output shaft position to the second output shaft position, wherein the first motor rotates the output shaft about the longitudinal axis in response to the limit switch being activated.

6. The blind rivet nut-setting tool of claim 4, wherein in response to the carrier reaching the second carrier position, the second motor moves the carrier along the longitudinal axis in a forward direction from the second carrier position toward the first carrier position.

7. The blind rivet nut-setting tool of claim 4, further comprising a drive shaft configured to receive torque from the first motor, the drive shaft engaged with the output shaft at a rear end of the output shaft, such that the output shaft is configured to receive torque from the drive shaft in response to the drive shaft receiving torque from the first motor.

8. The blind rivet nut-setting tool of claim 4, further comprising a magnet on the cam member and a sensor configured to detect the magnet when the carrier is in the second carrier position, wherein in response to the sensor detecting the magnet, the second motor rotates the cam member in a second direction that is opposite the first direction to move the carrier in a forward direction from the second carrier position toward the first carrier position.

9. The blind rivet nut-setting tool of claim 4, wherein the carrier includes a bore and the output shaft includes a flange arranged in the bore, such that in response to the carrier moving from the first carrier position to the second carrier position, the output shaft is translated rearward along the longitudinal axis.

10. The blind rivet nut-setting tool of claim 9, further comprising a spring arranged in the bore and engaged against the flange of the output shaft, such that the spring biases the output shaft toward the first output shaft position.

11. The blind rivet nut-setting tool of claim 9, further comprising a limit switch that is activated when the output shaft is moved from the first output shaft position to the second output shaft position, wherein the first motor rotates the output shaft about the longitudinal axis in response to the limit switch being activated.

12. The blind rivet nut-setting tool of claim 11, wherein the limit switch is arranged in the bore and includes an actuating arm, and wherein the limit switch is activated when the flange of the output shaft engages against and moves the actuating arm from a neutral position to an actuating position in response to the output shaft moving from the first output shaft position to the second output shaft position.

* * * * *